United States Patent
Imaizumi et al.

(10) Patent No.: US 9,514,195 B2
(45) Date of Patent: *Dec. 6, 2016

(54) TRIGGERING AND RANKING OF NATIVE APPLICATIONS

(71) Applicant: Google Inc., Mountain View, CA (US)

(72) Inventors: Ryoichi Imaizumi, Mitaka (JP); Toshiaki Fujiki, Minato (JP); Chaesang Jung, Palo Alto, CA (US); Reiko Hamada, Tokyo (JP); Jaehyun Yeom, Mountain View, CA (US); Hui Xu, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/963,942

(22) Filed: Dec. 9, 2015

(65) Prior Publication Data

US 2016/0098408 A1 Apr. 7, 2016

Related U.S. Application Data

(63) Continuation of application No. 14/196,701, filed on Mar. 4, 2014, now Pat. No. 9,251,224.

(51) Int. Cl.
*G06F 17/30* (2006.01)
*G06Q 30/06* (2012.01)

(52) U.S. Cl.
CPC ....... *G06F 17/3053* (2013.01); *G06F 17/3051* (2013.01); *G06F 17/30554* (2013.01); *G06F 17/30867* (2013.01); *G06Q 30/0631* (2013.01)

(58) Field of Classification Search
None
See application file for complete search history.

(56) References Cited

U.S. PATENT DOCUMENTS

| | | | |
|---|---|---|---|
| 7,617,225 | B2 | 11/2009 | Arrouye et al. |
| 8,086,957 | B2 | 12/2011 | Bauchot et al. |
| 8,392,394 | B1 | 3/2013 | Kumar et al. |
| 8,458,384 | B2 | 6/2013 | Johnson |
| 8,510,764 | B1 | 8/2013 | Deselaers |
| 8,515,979 | B2 | 8/2013 | Mehta |
| 8,554,345 | B2 | 10/2013 | Fernandez |
| 8,595,450 | B2 | 11/2013 | Nguyen |
| 2004/0030882 | A1 | 2/2004 | Forman |

(Continued)

FOREIGN PATENT DOCUMENTS

| | | |
|---|---|---|
| EP | 2474905 | 7/2012 |
| EP | 2495670 | 9/2012 |

OTHER PUBLICATIONS

"Adding deep linking to Google+ posts shared from your iOS app," [online] [Retrieved on Jan. 7, 2014]; Retrieved from the Internet URL: https://developers.google.com/+/mobile/ios/share/deep-link; 3 pages.

(Continued)

*Primary Examiner* — Wilson Lee
(74) *Attorney, Agent, or Firm* — Fish & Richardson P.C.

(57) ABSTRACT

Methods, systems, and apparatus, including computer programs encoded on a computer storage medium, for determining when to search a native application corpus for native applications and insert native application search results into a set of general web search results in response to receiving a query.

17 Claims, 4 Drawing Sheets

(56) References Cited

U.S. PATENT DOCUMENTS

| | | | |
|---|---|---|---|
| 2007/0198481 A1* | 8/2007 | Hogue | G06F 17/30572 |
| 2007/0209080 A1 | 9/2007 | Ture | |
| 2009/0019105 A1* | 1/2009 | Sebastian | G06F 17/30887 709/202 |
| 2009/0276377 A1* | 11/2009 | Dutta | G06Q 30/02 706/12 |
| 2010/0185619 A1* | 7/2010 | Zhang | G06F 17/30861 707/738 |
| 2010/0257466 A1 | 10/2010 | Wroblewski | |
| 2010/0306191 A1 | 12/2010 | LeBeau | |
| 2011/0055197 A1* | 3/2011 | Chavan | G06F 17/3046 707/713 |
| 2011/0252038 A1 | 10/2011 | Schmidt | |
| 2011/0314004 A1 | 12/2011 | Mehta | |
| 2012/0124061 A1 | 5/2012 | Macbeth et al. | |
| 2012/0179706 A1 | 7/2012 | Hobbs | |
| 2012/0179955 A1 | 7/2012 | French | |
| 2012/0290584 A1 | 11/2012 | De | |
| 2012/0316955 A1 | 12/2012 | Panguluri et al. | |
| 2012/0323898 A1 | 12/2012 | Kumar | |
| 2013/0006897 A1 | 1/2013 | Jain | |
| 2013/0110815 A1 | 5/2013 | Tankovich | |
| 2013/0111328 A1 | 5/2013 | Khanna | |
| 2013/0122861 A1 | 5/2013 | Kim | |
| 2013/0124606 A1 | 5/2013 | Carpenter | |
| 2013/0191360 A1 | 7/2013 | Burkard | |
| 2013/0218904 A1* | 8/2013 | Jagota | G06F 17/30312 707/748 |
| 2013/0232256 A1 | 9/2013 | Lee | |
| 2013/0298007 A1 | 11/2013 | Cullen | |
| 2013/0325856 A1 | 12/2013 | Soto | |
| 2014/0040226 A1 | 2/2014 | Sadhukha et al. | |

OTHER PUBLICATIONS

"App Linking," [online][Retrieved on Jan. 7, 2014]; Retrieved from the Internet URL: https://developers.facebook.com/docs/android/link-to-your-native-app/; 14 pages.

"Class Gecko View Content," [online][Retrieved on Jan. 2, 2014]; Retrieved from the Internet URL: people.mozilla.org/~mfinkle/geckoview/docs/org/Mozilla/gecko/GeckoViewContent.html; 4 pages.

"Deeplink.me Lets Mobile Users Navigate Through A "Web" of Apps," [online][Retrieved on Dec. 13, 2013]; Retrieved from the Internet URL: techcrunch.com/2013/05/22/new-service-called-deeplink-me-will-let-mobile-users-navigate-through-a-web-of-apps/; 8 pages.

"Frequently Asked Questions—General Information," [online][Retrieved on Jan. 7, 2014]; Retrieved from the Internet URL: https://linksmanager.com/Frequently+Asked+Questions+-+General+Information; 8 pages.

"Google's Search Results Can Deep-Link to Your Android Apps," [online][Retrieved on Dec. 13, 2013]; Retrieved from the Internet URL: techcrunch.com/2013/10/31/android-4-4-kitkat-app-indexing/; 6 pages.

"How to determine when an application is fully launched?" [online][Retrieved on Jan. 2, 2014]; Retrieved from the Internet URL: social.msdn.microsoft.com/Forums/en-US/27e7353-eb4b-4e23-bf56-84f3efbbecba/how-to-determine-when-an-application-is-fully-launched; 5 pages.

"How to get a deep link of my application from the Windows Phone Marketplace using .NET code?" [online][Retrieved on Dec. 13, 2013]; Retrieved from stackoverflow.com/questions/13639564/how-to-get-a-deep-link-of-my-application-from-the-windows-phone-marketplace-usin; 2 pages.

"Indexing apps just like websites," [online][Retrieved on Dec. 13, 2013]; Retrieved from the Internet URL: googlewebmastercentral.blogspot.com/2013/10/indexing-apps-just-like-websites.html; 4 pages.

"Instant Pages on Google Chrome," [online][Retrieved on Dec. 16, 2013]; Retrieved from the Internet URL: chrome.blogspot.jp/2011/08/instant-pages-on-google-chrome.html; 3 pages.

"Mobile deep linking," [online][Retrieved on Dec. 13, 2013]; Retrieved from the Internet URL: en.wikipedia.org/wiki/Mobile_deep_linking; 2 pages.

"NSApplication Class Reference," [online][Retrieved on Jan. 2, 2014]; Retrieved from the Internet URL: https://developer.apple.com/library/mac/documentation/cocoa/reference/applicationkit/classes/NSApplication_Class/Reference/Reference.html; 66 pages.

"Ready for a "Web" of Apps? Quixey Launches AppURL, A New Way to Enable Deep Linking Across Mobile Applications," [online][Retrieved on Dec. 13, 2013]; Retrieved from the Internet URL: techcrunch.com/2013/08/02/ready-for-a-web-of-apps-quixey-launches-appurl-a-new-way-to-enable-deep-linking-across-mobile-applications/; 8 pages.

"Seven Tips for Supercharging Your Links," [online][Retrieved on Jan. 7, 2014]; Retrieved from the Internet URL: goarticles.com/article/Seven-Tips-For-Supercharging-Your-Links/3056299/; 5 pages.

"Sharing to Google+ from your Android app," [online][Retrieved on Jan. 7, 2014]; Retrieved from the Internet URL: https://developers.google.com/+/mobile/android/share/#handling_incoming_deep_links; 2 pages.

International Search Report and Written Opinion in International Application No. PCT/US2015/018321, mailed May 27, 2015, 13 pages.

* cited by examiner

TRIGGERING AND RANKING OF NATIVE APPLICATIONS

CROSS-REFERENCE TO RELATED APPLICATIONS

This application is a continuation application of, and claims priority to, U.S. patent application Ser. No. 14/196,701, titled "Triggering and Ranking of Native Applications," filed on Mar. 4, 2014. The disclosure of the foregoing application is incorporated herein by reference in its entirety for all purposes.

BACKGROUND

This specification describes technologies relating to triggering the searching of and the ranking of native application content relative to web page resources.

The Internet provides access to a wide variety of information. For example, digital image files, video and/or audio files, as well as web page resources for particular subjects or particular news articles, are accessible over the Internet. With respect to web page resources, many of these resources are designed to facilitate the performing of particular functions, such as banking, booking hotel reservations, shopping, etc., or to provide structured information, such as on-line encyclopedias, movie databases, etc. With the advent of tablet computers and smart phones, native applications that facilitate the performance of the same functions facilitated by the use of web page resources are now being provided in large numbers.

Additionally, native applications that do not have websites with synchronous content, such as games, are also very popular on tablet computers and smart phones. Many of these latter types of native applications also have web pages that are descriptive of the native application, such as a product page that can be browsed using a web browser. The product page may include screen shots of the native application, user ratings, and the like.

Search engines now also facilitate searching of these native applications. A user's informational need may thus be satisfied by providing search results that identify either one (or both) of a particular web page resource that describes a native application, and a search results for the native application itself.

SUMMARY

In general, one innovative aspect of the subject matter described in this specification can be embodied in methods that include the actions of for each query submitted for a respective first search operation and for which first resources have been identified by the first search operation as being responsive the query, wherein each first resource is a webpage resource: determining a search probability ratio for the query that is at least based on a measure of a likelihood of the query being submitted for a second search operation being of search operation type that is different from a search operation type of the first search operation; for each query for which the search probability ratio for the query meets a threshold search probability ratio: initiating the second search operation and receiving data indicating second resources identified by the second search operation as being responsive the query, each second resource being a native application; determining, based at least on the search probability ratio, whether to insert a search result identifying the second resource in a set of search results identifying the first resources; and for each query for which a determination is made to insert a search result identifying the second resource in a set of search results identifying the first resources, inserting the search result identifying the second resource in the set of search results identifying the first resources. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The subject matter allows the scoring and ranking of native applications against the content of web page resources, and thus provides users with additional search result options that may better satisfy the users' informational needs. Triggering for the searching and providing a native application search result is based, in some implementations, on signals that are indicative of a likelihood that the native application will satisfy the user's informational need. Furthermore, the ranking of the native application search result relative to web search results may be based, in part, on a web search result ranking for a web page that describes the native application, e.g., a product page from which the native application can be purchased or downloaded. In such implementations, the native application search result may replace the product page search result, provided the user device that receives the native application search result is operable to download and execute the native application. This provides a streamlined and intuitive user experience, which, in turn, increases the likelihood that that user's informational need will be satisfied.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A system determines when to search a native application corpus for native applications and insert native application search results into a set of general web search results in response to receiving a query. The search can optionally be based on a search probability ratio. As used herein, a native application generates environment instances for display on a user device within an environment of the native application, and operates independent of a browser application on the user device. A native application is an application specifically designed to run on a particular user device operating system and machine firmware. Native applications thus differ from browser-based applications and browser-rendered resources. The latter require all, or at least some, elements or instructions downloaded from a web server each time they are instantiated or rendered. Furthermore, browser-based applications and browser-rendered resources can be processed by all web-capable mobile devices within the browser and thus are not operating system specific.

If a search is triggered, the corpus is searched for native applications and the native applications are scored. A variety of scoring signals can be used, including indexed content of native applications, user ratings of the native applications, the query popularity for queries received for searches of the application corpus, etc. Native applications, once scored in response to the query, are ranked, and one or more native application search results may be provided to the user device in response to the query.

Whether a native application search result is provided, and if provided, the position of the native application search result relative to other search results, is determined based on filtering criteria and ranking criteria. The filtering criteria and ranking criteria may include the ranking of a corresponding resource that describes the native application relative to other resources, the scores of the native applications, and other factors.

These features and other features are described in more detail below.

Figure 1:
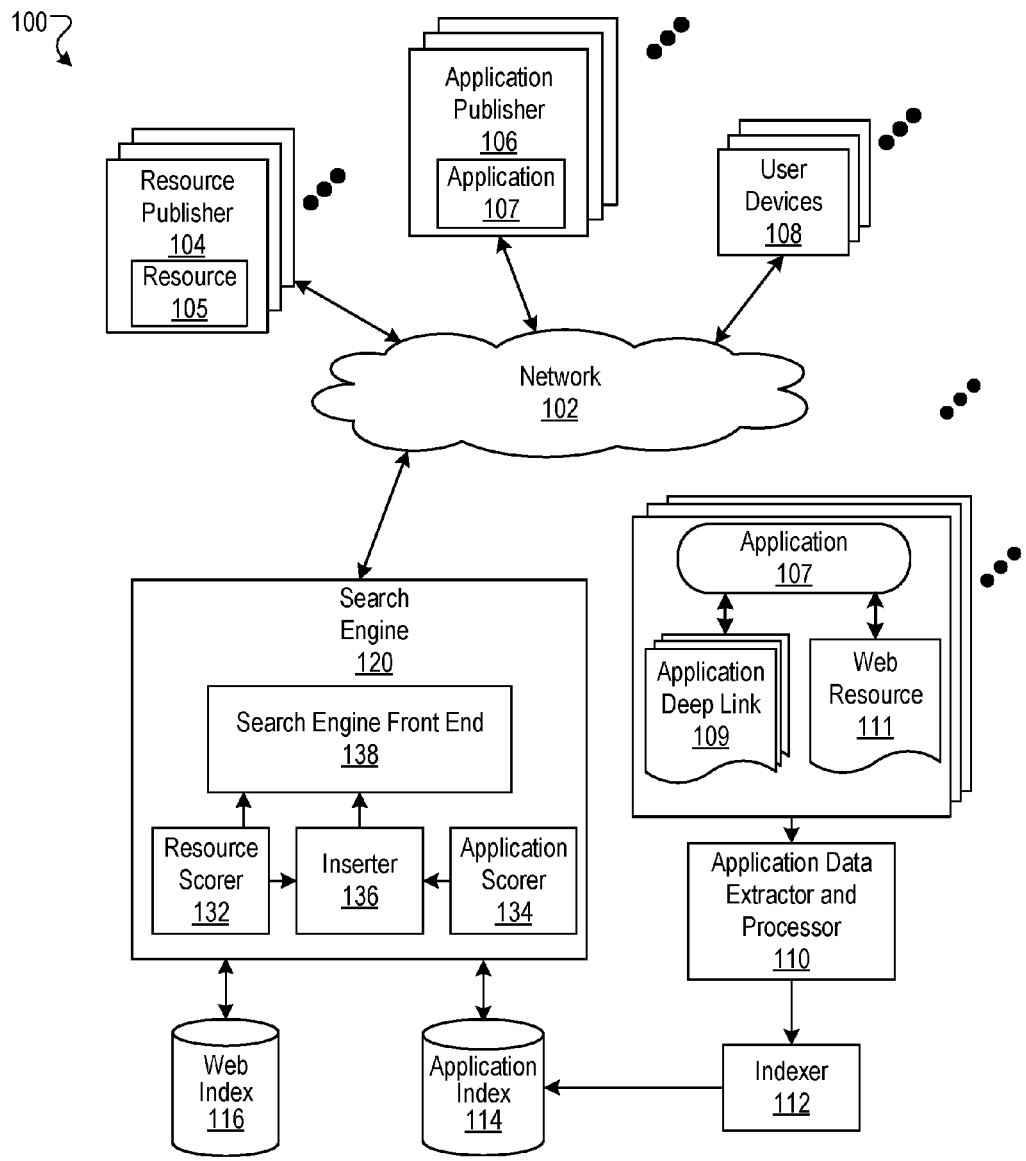
FIG. 1 is a block diagram of an example environment in which triggering the search of and the ranking of native applications occurs.

FIG. 1 is a block diagram of an example environment 100 in which triggering the search of and the ranking of native applications occurs. A computer network 102, such as the Internet, connects resource publisher websites 104, application publishers 106, user devices 108 and a search engine 120.

A resource publisher website 104 includes one or more web resources 105 associated with a domain and hosted by one or more servers in one or more locations. Generally, a resource publisher website is a collection of web pages formatted in hypertext markup language (HTML) that can contain text, images, multimedia content, and programming elements. Each website 104 is maintained by a content publisher, which is an entity that controls, manages and/or owns the website 104.

A web page resource is any data that can be provided by a publisher website 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts. More generally, a "resource" is anything identifiable over a network, and can also include native applications.

An application publisher website 106 may also include one or more web resources 105, and also provides native applications 107. As described above, a native application 107 is an application specifically designed to run on a particular user device operating system and machine firmware. Native applications 107 may include multiple versions designed to run on different platforms. For example, native applications corresponding to a movie database web site may include a first native application that runs on a first type of smart phone, a second native application that runs on a second type of smart phone, a third native application that runs on a first type of tablet, etc.

As used in this specification, an "environment instance" is a display environment within a native application and in which is displayed content, such as text, images, and the like. An environment instance is specific to the particular native application, and the native application is specific to the particular operating system of the user device 108. An environment instance differs from a rendered web resource in that the environment instance is generated within and specific to the native application, while a web resource may be rendered in any browser for which the web page resource is compatible, and is independent of the operating system of the user device.

A user device 108 is an electronic device that is under the control of a user. A user device 108 is typically capable of requesting and receiving web page resources 104 and native applications 107 over the network 102. Example user devices 108 include personal computers, mobile communication devices, and tablet computers.

To search web resources 105 and the native applications 107, the search engine 120 accesses a web index 116 and an application index 114. The web index 116 is an index of web resources 105 that has, for example, been built from crawling the publisher websites 104. The application index 114 is an index of application pages for native applications 107, and is constructed using an application data extractor and processor 110 and an indexer 112. Although shown as separate indexes, the web index 116 and the application index 114 can be combined in a single index.

The user devices 108 submit search queries to the search engine 120. In response to each query, the search engine 120 accesses the web index 116 and, optionally, the application index 114 to identify resources and applications, respectively, that are relevant to the query. Generally, a first type of search operation implementing a first search algorithm is used to search the index 116, and a second type of search operation implementing a second, different algorithm is used to search the application index 114. The search engine 120 implements a resource scorer 132 process to score web resources, and an application scorer 134 process to score native applications. A variety of appropriate search engine algorithms can be used to implement the resource scorer 132. Operation of the application scorer 134 is described in more detail with reference to FIGS. 2 and 3 below.

In the event the native application index 114 is searched and a native application search result is to be provided to a user device, the search engine 120 utilizes an inserter 136 to insert the native application search result into search results of other resources. The insertion is described in more detail with reference to FIGS. 2 and 3 below. The search engine 120 utilizes a search engine front end 138, such as a web server, arrange and provide the search results to the user device 108 from which the query was received.

A web resource search result is data generated by the search engine 120 that identifies a web resource and provides information that satisfies a particular search query. A web resource search result for a resource can include a web page title, a snippet of text extracted from the resource, and a resource locator for the resource, e.g., the URL of a web page. A native application search result specifies a native application and is generated in response to a search of the application index 114. A native application search result may include a "deep link" specifying a particular environment instance of the native application and which is configured to cause the native application to instantiate the specified environmental instance. For example, selection of a native application search result may cause the native application to launch (if installed on the user device 108) and generate an environment instance referenced in the application search result in the form of a screen shot. Alternatively, a native application search result may include a "purchase" (or "install") command that, when selected, results in a purchase (or free download) and installation of the native application on a user device.

Publishers 106 that provide native applications 107 also provide the deep links 109 to the search engine 120. For example, an application publisher may provide a list of deep links 109 in the form of uniform resource identifiers (URIs) (or other instruction types that are specific to the native application published by the publisher). These deep links are deep links that publisher 106 desires to be crawled and indexed in the application index 114.

For many native applications 107, there also exist web resources 111 that are descriptive of the native applications 107. One example of such a resource 111 is a product page in an on-line native application store. The product page can be browsed using a web browser, and can be indexed in the web index 116. The product page 11 may include screen shots of the native application, descriptions of user ratings, and the like. Typically the product page 111 is a web page specific to the native application, and is used to facilitate a purchase and/or download of the native application.

In certain situations, depending on the search query and the corresponding web based search result, the search engine 120 may include in a set of web page search results a native application search result. The native application search result may be, for example, inserted at a position relative to a product web page search result for the native application, or, alternatively, may entirely replace the product web page search result. Whether to search a native application index 114 and process resulting native application search results is described with reference to FIGS. 2 and 3 below.

Figure 2:
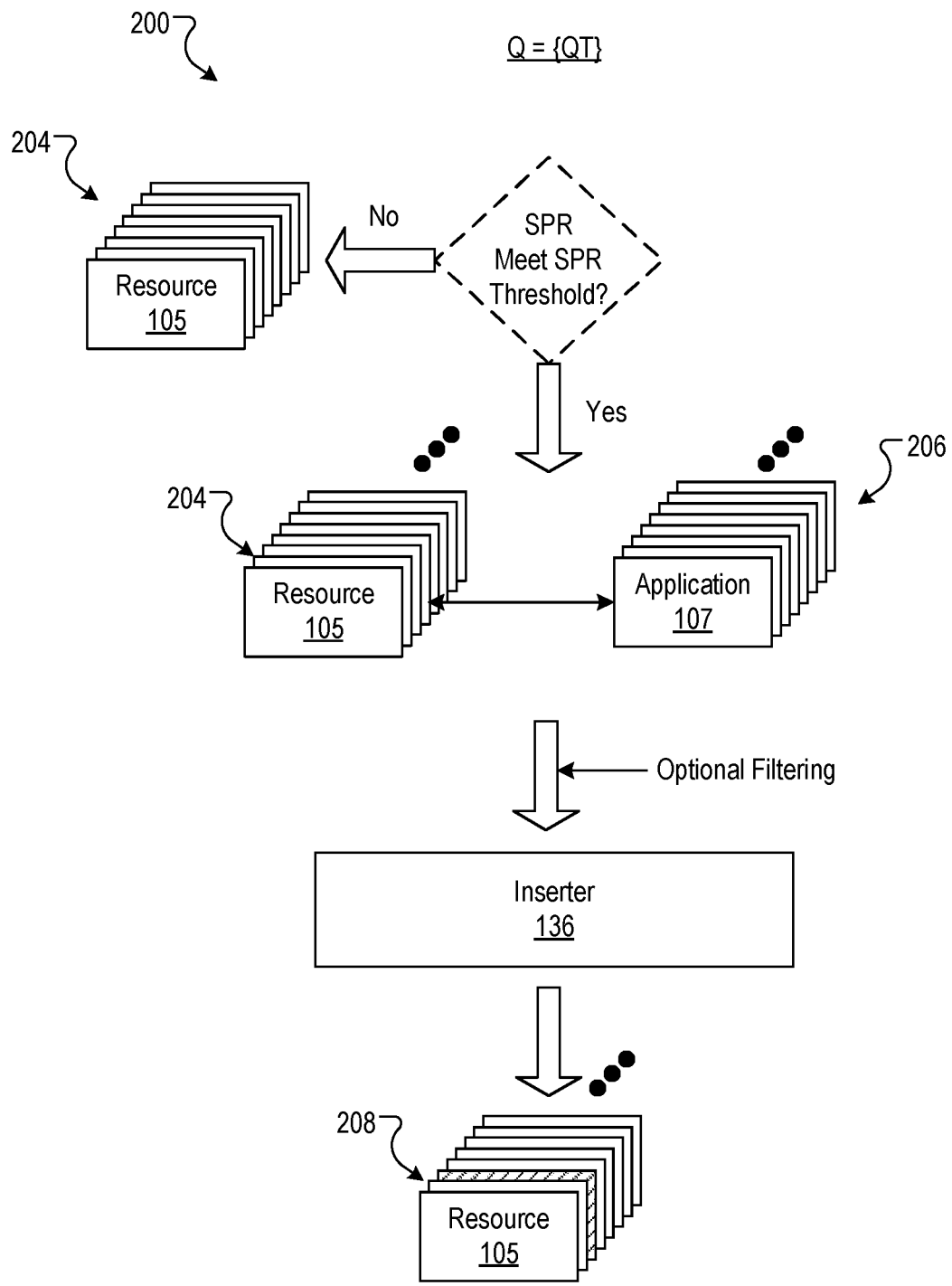
FIG. 2 is a system flow diagram for searching and scoring native applications.

FIG. 2 is a system flow diagram 200 for searching and scoring native applications. The system flow diagram 200 is described with reference to FIG. 3, which is a flow diagram 300 of an example process of triggering a search of and scoring native applications. The process 300 can be implemented in a data processing apparatus of one or more computers that are in data communication. The process 300 is done for each query received at the search engine 120.

The process 300 receives a query and determines a search probability ratio (SPR) (302). The query is received by the search engine 120, and is represented in FIG. 2 by the query Q={QT}, where {QT} are the terms of the query Q. For example, a user may input the query into a user interface provided by the search engine 120. The user interface may be an interface that is used to search a variety of corpora, such as a general web corpus and other corpora.

In some implementations, the search probability ratio is the ratio of the likelihood of a query being received for a target corpus or vertical to the likelihood of the query being received for a reference corpus. A reference corpus can be any corpus selected by an administrator, and typically is a general web corpus. Other corpora can be used as the reference corpus, however. For example, if the likelihood of receiving a query q in an on-line application store is 0.003, and the likelihood of receiving the query q in the reference corpus is 0.001, then the SPR for q is 3, i.e., 0.003/0.001. The SPR may be expressed as $$SPR(q) = (\#q_T / \#\{Q\}_T) / (\#q_R / \#\{Q\}_R)$$

Where:
$\#q_T$ = number of instances of query q in the target property or corpus;
$\#\{Q\}_T$ = number of instances of all queries in the target property or corpus;
$\#q_R$ = number of instances of query q in the reference property or corpus; and
$\#\{Q\}_R$ = number of instances of all queries in the reference property or corpus.

Other types of search probability ratios can also be used. For example, the search probability ratio can be the likelihood of a query being issued for a search of a particular corpus. For example, in the context of native application, the search probability ratio is a likelihood that the query is being issued for a search of native applications given a total number of instances of the query in the target property and the reference corpus. Alternatively, the SPR for a particular corpus can be the ratio of the number of instances for the particular corpus to the total number of instances for several corpora combined.

The data to determine a search probability ratio can be gathered in a variety of ways. In some implementations, search engines that provide for the ability to search particular corpora, such as a web corpus, an image corpus, a native application corpus, and the like, can track, for each query, the number of instances that each query is submitted for each corpus.

In other implementations for native application in particular, a search engine may have access to query logs for on-line stores that offer native applications. The number of instances of the query can be compared to the number of instance of the query submitted for a search of one or more other corpora to determine the search probability ratio for the native application.

Other appropriate ways of determining a search probability ratio can also be used.

The process 300 initiates a first search operation and receives data indicating first resources identified by the first search operation as being responsive the query (304). For example, the search engine 120 searches the web index 116 and scores the resources, e.g., web pages, using the resource scorer 132. The first resources, which are the web resources, can be ranked according to the scores. A set or ranked web resources 204 is shown in FIG. 2. A variety of appropriate search algorithms can be used.

The process 300 determines if the search probability ratio meets a threshold search probability ratio (306). This step is an optional step, as indicated by the dashed outline of the process decision block. The threshold search probability ratio can be selected by a system administrator, or can vary according to query volume. For example, the search probability ratio can be a threshold value of 0.6, or some other value; or, alternatively, can be ratio selected so that a certain percentage of queries submitted for searches of the native application index 114 are selected. Other appropriate ways of selecting a search probability ratio can be used.

If the search probability ratio does not meet the threshold search probability ratio, then the process 300 provides only first search results to a user device (308). In these situations, the search engine 120 provides only search results for the web index 116, or results for another corpus that was selected by a user, such as image search results, video search results, etc. This is indicated in FIG. 2 by the set of resources 204 at the terminus of the "No" flow arrow.

Conversely, if the search probability ratio does meet the threshold search probability ratio, or if initial thresholding check is not implemented, then the process 300 initiates a second search operation and receives data indicating second resources identified by the second search operation as being responsive the query (310). The second search operation is, for example, a search of the native application index 114 using the application scorer 134. A ranked set of native applications is indicated by the set 206 in FIG. 2, along with the set of resources 204 at the terminus of the "Yes" flow arrow.

A variety of data may be used to rank the native applications. Such data may include one or more of installation data, usage data, ratings data, semantic signals, keyword data, recency, and developer quality ratings.

Installation data describes the number of installations (or, alternatively, the number of downloads) of the native application. The link data can be aggregated from multiple different download resources. In some implementations, the number of downloads are partitioned by application type. For example, if a native application has both a smart phone version and a tablet version, then a separate download number is determined for each application. In other implementations, the number of downloads for each native application type can be aggregated to determine an overall native application download number. The links counted can also include application links from application pages of other native applications to the native application. Very high levels of downloads relative to other native applications can result in an increase in the native application score, while very low levels of downloads relative to other native applications can result in a decrease in the native application score.

Usage data describes the overall usage of the application. The overall usage may be based on a per-device or per-installation basis. Examples of usage information include time instantiated, engagement based on the number of application page views and user interactions, and other appropriate usage parameter values. Very high levels of usage relative to other native applications can result in an increase in the native application score, while very low levels of usage relative to other native applications can result in a decrease in the native application score.

Ratings data describes user ratings of the application. In some implementations, the ratings data are partitioned according to versions so that ratings of prior versions do not affect ratings of current versions. The ratings data can be gathered from resources from which the native application can be downloaded or otherwise describe the ratings data. Very positive ratings can result in an increase in the native application score, while very negative ratings can result in a decrease in the native application score. For example, "star" ratings and the like for a particular application can be collected from various sites and used in ranking the application.

Semantic signals data describes user sentiments regarding native applications. Semantic signals data can be determined, for example, by using sentiment detection processes on user input data, such as user reviews. Very positive sentiments can result in an increase in the native application score, while very negative sentiments can result in a decrease in the native application score.

Keywords and text content can be used to score native applications for specific keywords. The specific keywords can be, for example, a set of common and high frequency keywords, or, alternatively, can be keywords from a received query. A variety of appropriate relevancy algorithms can be used.

Native application recency describes how long the native application (or current version of the native application) has been released. Very recent applications may receive a scoring penalty or scoring cap (either positive or negative), while native applications that have been available a relatively longer time (e.g., more than a month) may not be subject to such penalties or caps.

Developer quality ratings are ratings of developers that publish native applications. For example, a develop that publishes high quality, stable, and highly ranked native application will a have relatively high developer rating when compared to a developer that publishes lower quality, often unstable, and low ranked native applications. A higher developer rating will result in a higher native application score.

Still other factors can also be used in scoring native applications. In some implementations, the application scorer 134 may also take into account user device specific signals that are indicative of relevance of the native application for a user device. User device specific signals can, for example, be taken into account at query time. Examples of user device specific signals include installation status, instantiation status, use frequency, and application stability. Other appropriate user device specific signals can also be used.

Installation status is determined from whether a user device has a particular native application installed on the user device. If a native application is installed, the system may increase the relevance of the application for that particular user device relative to other user devices that do not have the native application installed.

Instantiation status is determined from whether a user device has a particular native application that is installed running on the user device. If a native application is running, the system may increase the relevance of the application. This may be useful, for example, when the native application search results include deep links.

Use frequency describes how frequently over a given period of time a user device uses the native application. As the use frequency increases, the system increases the relevance of the native application for the particular user device.

Application stability describes how stable the native application is on the user device. Native applications that tend to crash, freeze or experience other errors on a particular user device are determined to be less relevant than for another user device for which the native application exhibits better stability. The stability may be affected by the user device operating system, or by other applications that may interfere with the native application.

Other data may also be used to score and rank native applications.

After scoring, the process 300 determines, for a second resource identified by the second search operation, a first resource identified by the first search operation that is descriptive of a second resource (312). In the context of the second resource being a native application, an example of such a first resource is a product page of the native application. The product page is a web page that has been crawled by the search engine 120, indexed in the web index 116, and scored in the first search operation. This is illustrated in FIG. 2 by the double sided arrow connecting one web page resource 105 to one native application 107. The determination can be made, for example, by accessing data indicating the association of the native application 107 and the resource 105, or by inferring the relationship from keywords and other data.

The process 300 determines whether to insert a search result identifying the second resource (314). The determination can be made based on the search probability ratio of the query, the corresponding score of the first resource, and the corresponding score of the second resource. For example, the web page 105 corresponding to the native application 107 may be required to meet a minimum score such that it is within the top N ordinal positions of the ranked resources 105, e.g., one of the top 10 ranked web page resources. Likewise, the native application score may be required to meet a minimum score such that it is within the top M ordinal positions of the ranked native applications 107, e.g., one of the top three ranked native applications.

In some implementations, the score of the native application 107 and the search probability ratio may be combined, e.g., multiplied or combined by some other appropriate mathematical operation, to determine whether to insert a native application search result. For example, the mathematical operation may be selected such that the combination of the search probability ratio and the native application score must meet an insertion threshold for the native application to be inserted, e.g., $$IS=f(SPR,NA\_S)>IS\_T$$

where:
   SPR is the search probability ratio;
   NA_S is the native application score;
   IS_T is the insertion score threshold;
   IS is the insertion score; and
   f(arg1, arg2) is a mathematical function.

Other features can also be used to determine whether to insert the native application search result. For example, the utility of the native application relative to the particular user device can also be used in determining whether to provide a native application search result. For example, if a native application is not available for a particular user device, then the native application search result may not be provided for the user device.

In some implementations, the distribution of the first search result and the second search results may also be used to determine whether to provide a native application search result. For example, if a query is "navigational" for a native application, then the native application search result is not precluded from being provided. To illustrate, assume a native application title is "Best Chess." The query [best chess] may be navigational in the context of a native application as it is indicative of one application result that is highly satisfactory of a user's informational need. Conversely, assume a native application is a news reader for a very popular news site, e.g., "CNN." Because a query with the name of the news site is navigational to the news site, the query is not necessarily indicative of one application result being highly satisfactory of a user's informational need.

Likewise, if a query is "informational," meaning there are multiple results that are highly responsive to the query, then a native application search result may be suppressed. For example, instead of the query [best chess], assume a user inputs the query [chess applications]. Even though such a query may satisfy a search probability ratio, the application results may be so varied that one native application search result will be unlikely to satisfy the user's informational need, as the users informational need is not clear. For example, the user may desire a chess game, or a chess application that provides opening books, etc.

In variations of this implementation, a set of two or more native application search results can be provided, e.g., native application search results for the top two or three native applications may be provided. The number of native application search results to provide may be dependent on, for example, a score distribution of the native applications. For example, if the score distribution for more than a threshold number of native applications is flat, then the native application search results may be suppressed. Conversely, the score distribution indicates that less than the threshold number of native applications score highly relative to all the native applications responsive to the search query, then native application search results may be provided for the highly scoring native applications.

If the process 300 determines not to insert a search result identifying the second resource, then the process 300 provides only first search results to a user device (308). Conversely, if the process 300 determines to insert a search result identifying the second resource, then the process 300 inserts the search result identifying the second resource in the set of search results identifying the first resources (316). The inserter 136 can be configured to insert the native application search result at a location that is dependent on one or more factors.

For example, in some implementations, a native application search result for a native application 107 can be inserted (or even replace) a web page search result of a web page resource 105 that is descriptive of the native application.

Alternatively or in addition, the search probability ratio of the query may be used to determine an insertion location. For example, the insertion score may correspond to first ordinal position when the search probability ratio meets a first insertion threshold, a second ordinal position when the search probability ratio meets a second insertion threshold but does not meet the first insertion threshold, or a third ordinal position when the search probability ratio meets a third insertion threshold but does not meet the second insertion threshold. The first ordinal position may be, for example, the first position in the set of search results 208; the second ordinal position may be the third position in the set of search results 208; and the third ordinal position may be the fifth position in the set of search results 208. Alternatively, the third ordinal position may correspond to position of the first resource identified by the first search operation that is descriptive of the second resource. Other ordinal positions and threshold may be used.

Figure 3:
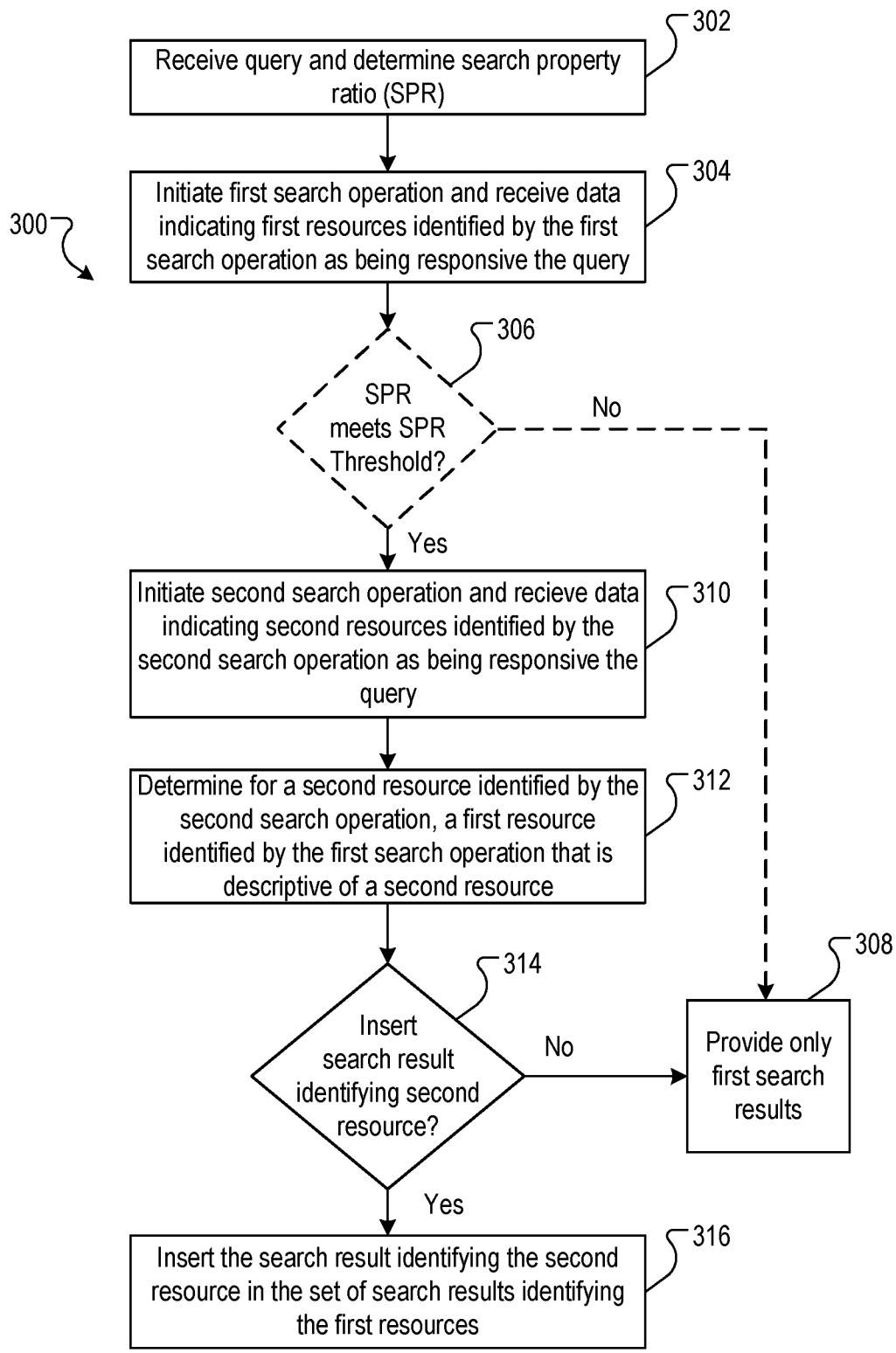
FIG. 3 is a flow diagram of an example process of triggering a search of and scoring native applications.

The examples described with reference to FIGS. 2 and 3 are not exhaustive, and additional variations and features can be implemented. For example, while the example above triggers a search of the application index 114 based on a search probability ratio, additional criteria can also be used to filter such queries. For example, the query may be required to meet a minimum popularity threshold, e.g., the query may be required to not be a "long tail query." To illustrate, assume again the native application title is "Best Chess," and also assume that the native application is quite popular. There will be many queries that meet the search probability ratio threshold, e.g., [best chess], [best chess download], [best chess application], etc. However, there may be some queries that are very infrequent, but may nevertheless meet the search probability ratio threshold, e.g., assume a first user entered the query [best chess engine tutorial webpage] for a search of an online application store, and at a later time a second user enters the same query in the search engine 120 interface. Because there is only one instance in the online application store logs and one instance in the search engine 120 logs, the search probability ratio will be relatively high (50%). However, because this is a "long tail query," it will not be processed to conduct a second search operation of the application index for the second user.

Feedback signals can also be used to filter triggering. For example, for a certain query for which a native application search result is provided, assume the native application search result is selected at a much lower rate than other native application search results for other queries. This selection rate can be monitored and if the selection rate falls below a threshold, processing of the query to search the native application index 114 may be precluded.

Figure 4:
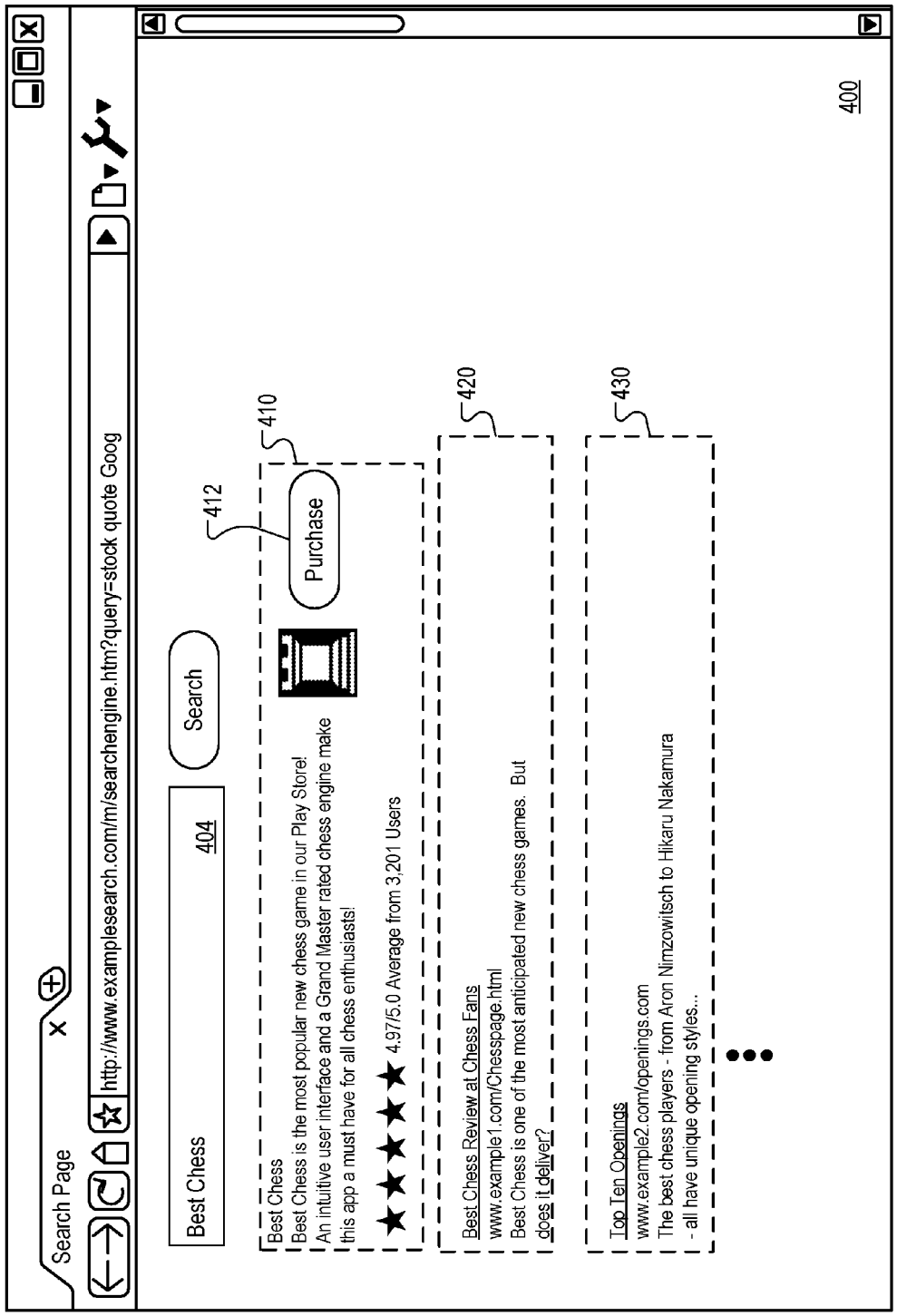
FIG. 4 is an illustration of a search results page including a native application search result.

FIG. 4 is an illustration of a search results page 400 that includes a native application search result for a native application ranked against web resources. Displayed in the search results page 400 are search results 410, 420 and 430 that are responsive to the query "Best Chess" displayed in the search input field 404. The search result 410 is a native application search result that is generated in response to a search of the application index 114. The search result 410 may include, for example, a description of the native application, an icon, rating information, and a command 412. Selecting the command 412, or, alternatively, the native application search result, may invoke a purchasing operation in which the user may purchase and install the native application. Alternatively, if the application is already installed, the command 412 may instead be a "launch" command that launches the native application.

The search results 420 and 430 are web search results generated in response to a search of a web index 116 of resources. Each search result 420 and 430 references a resource that can be rendered in a browser application on a user device and includes a link to the resource, and other data, such as a snippet of text extracted for the referenced resource.

In the example of FIG. 4, the native application search result 410 is used to replace a search result that references the web resource product page that is descriptive of the native application. Had the native application not be available for the user device, a search result for the product page for the native application would be shown instead of the native application search result 410.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method performed by data processing apparatus comprising one or more computers in data communication, the method comprising:
   for each query submitted for a respective first search operation and for which first resources have been identified by the first search operation as being responsive the query, wherein each first resource is a webpage resource:
      determining a search probability ratio for the query that is at least based on a measure of a likelihood of the query being submitted for a second search operation being of search operation type that is different from a search operation type of the first search operation;
   for each query for which the search probability ratio for the query meets a threshold search probability ratio:
      initiating the second search operation and receiving data indicating second resources identified by the second search operation as being responsive the query, each second resource being a native application;
      determining, based at least on the search probability ratio, whether to insert a search result identifying the second resource in a set of search results identifying the first resources; and
   for each query for which a determination is made to insert a search result identifying the second resource in a set of search results identifying the first resources, inserting the search result identifying the second resource in the set of search results identifying the first resources.

2. The computer-implemented method of claim 1, wherein the initiating the second search operation and determining whether to insert a search result occurs only when the search probability ratio meets a threshold search probability ratio.

3. The computer-implemented method of claim 1, wherein determining, based at least on the search probability ratio, whether to insert a search result identifying the second resource in a set of search results identifying the first resources comprises:
   determining to insert the search result identifying the second resource when the second resource has a corresponding score that that meets a second threshold; and
   the first resource identified by the first search operation that is descriptive of the second resource has a corresponding score that meets a first threshold.

4. The computer-implemented method of claim 1, wherein inserting the search result identifying the second resource in the set of search results identifying the first resources comprises:
   determining an insertion score based, in part, on the search probability ratio, wherein the insertion score defines an ordinal insertion position at which a second resource search result referencing the second resource is to be inserted into a ranking of first resource search results referencing the first resources; and
   generating a search results resource for displaying the first resource search results according to their respective ordinal positions in the ranking and the second resource search results at the ordinal insertion position.

5. The computer-implemented method of claim 4, wherein determining an insertion score based, in part, on the search probability ratio comprises:
- determining an insertion score corresponding to a first ordinal position when the search probability ratio meets a first insertion threshold;
- determining an insertion score corresponding to a second ordinal position when the search probability ratio meets a second insertion threshold but does not meet the first insertion threshold; and
- determining an insertion score corresponding to a third ordinal position when the search probability ratio meets a third insertion threshold but does not meet the second insertion threshold.

6. The computer-implemented method of claim 5, wherein:
- the first ordinal position corresponds to a first, top ranked position in the search results identifying the first resources;
- the second ordinal position corresponds to a second position ranked lower than the first, top ranked position in the search results identifying the first resources; and
- the third ordinal position corresponds to a third position ranked lower than the second position in the search results identifying the first resources.

7. The computer-implemented method of claim 6, wherein the third ordinal position corresponds to position of the first resource identified by the first search operation that is descriptive of the second resource.

8. The computer-implemented method of claim 1, wherein inserting the search result identifying the second resource in the set of search results identifying the first resources comprises replacing a search result identifying a first resource that is descriptive of a second resource with a search result that identifies the second resource.

9. A system, comprising:
- a data processing apparatus including a hardware processor; and
- a non-transitory computer readable storage medium storing software instructions executable by the data processing apparatus and that upon such execution cause the data processing apparatus to perform operations comprising:
  - for each query submitted for a respective first search operation and for which first resources have been identified by the first search operation as being responsive the query, wherein each first resource is a webpage resource:
    - determining a search probability ratio for the query that is at least based on a measure of a likelihood of the query being submitted for a second search operation being of search operation type that is different from a search operation type of the first search operation;
  - for each query for which the search probability ratio for the query meets a threshold search probability ratio:
    - initiating the second search operation and receiving data indicating second resources identified by the second search operation as being responsive the query, each second resource being a native application;
    - determining, based at least on the search probability ratio, whether to insert a search result identifying the second resource in a set of search results identifying the first resources; and
  - for each query for which a determination is made to insert a search result identifying the second resource in a set of search results identifying the first resources, inserting the search result identifying the second resource in the set of search results identifying the first resources.

10. The system of claim 9, wherein the initiating the second search operation and determining whether to insert a search result occurs only when the search probability ratio meets a threshold search probability ratio.

11. The system of claim 9, wherein determining, based at least on the search probability ratio, whether to insert a search result identifying the second resource in a set of search results identifying the first resources comprises:
- determining to insert the search result identifying the second resource when the second resource has a corresponding score that that meets a second threshold; and
- the first resource identified by the first search operation that is descriptive of the second resource has a corresponding score that meets a first threshold.

12. The system of claim 9, wherein inserting the search result identifying the second resource in the set of search results identifying the first resources comprises:
- determining an insertion score based, in part, on the search probability ratio, wherein the insertion score defines an ordinal insertion position at which a second resource search result referencing the second resource is to be inserted into a ranking of first resource search results referencing the first resources; and
- generating a search results resource for displaying the first resource search results according to their respective ordinal positions in the ranking and the second resource search results at the ordinal insertion position.

13. The system of claim 12, wherein determining an insertion score based, in part, on the search probability ratio comprises:
- determining an insertion score corresponding to a first ordinal position when the search probability ratio meets a first insertion threshold;
- determining an insertion score corresponding to a second ordinal position when the search probability ratio meets a second insertion threshold but does not meet the first insertion threshold; and
- determining an insertion score corresponding to a third ordinal position when the search probability ratio meets a third insertion threshold but does not meet the second insertion threshold.

14. The system of claim 13, wherein:
- the first ordinal position corresponds to a first, top ranked position in the search results identifying the first resources;
- the second ordinal position corresponds to a second position ranked lower than the first, top ranked position in the search results identifying the first resources; and
- the third ordinal position corresponds to a third position ranked lower than the second position in the search results identifying the first resources.

15. The system of claim 14, wherein the third ordinal position corresponds to position of the first resource identified by the first search operation that is descriptive of the second resource.

16. The system of claim 9, wherein inserting the search result identifying the second resource in the set of search results identifying the first resources comprises replacing a search result identifying a first resource that is descriptive of a second resource with a search result that identities the second resource.

17. A non-transitory computer readable storage medium storing instructions executable by a data processing apparatus and that upon such execution cause the data processing apparatus to perform operations comprising:

for each query submitted for a respective first search operation and for which first resources have been identified by the first search operation as being responsive the query, wherein each first resource is a webpage resource:

determining a search probability ratio for the query that is at least based on a measure of a likelihood of the query being submitted for a second search operation being of search operation type that is different from a search operation type of the first search operation;

for each query for which the search probability ratio for the query meets a threshold search probability ratio:

initiating the second search operation and receiving data indicating second resources identified by the second search operation as being responsive the query, each second resource being a native application;

determining, based at least on the search probability ratio, whether to insert a search result identifying the second resource in a set of search results identifying the first resources; and for each query for which a determination is made to insert a search result identifying the second resource in a set of search results identifying the first resources, inserting the search result identifying the second resource in the set of search results identifying the first resources.

\* \* \* \* \*